US011178971B1

(12) United States Patent
Chen

(10) Patent No.: US 11,178,971 B1
(45) Date of Patent: Nov. 23, 2021

(54) MODULAR CHAIR ASSEMBLY

(71) Applicants: WATERSON CORP., Taichung (TW);
Waterson Chen, Taichung (TW)

(72) Inventor: Waterson Chen, Taichung (TW)

(73) Assignees: WATERSON CORP., Taichung (TW);
Waterson Chen, Taichung (TW)

( * ) Notice: Subject to any disclaimer, the term of this patent is extended or adjusted under 35 U.S.C. 154(b) by 0 days.

(21) Appl. No.: 16/881,959

(22) Filed: May 22, 2020

(51) Int. Cl.
| *A47C 5/12* | (2006.01) |
| *A47B 13/02* | (2006.01) |
| *A47D 1/00* | (2006.01) |
| *F16B 12/42* | (2006.01) |
| *F16B 12/44* | (2006.01) |

(Continued)

(52) U.S. Cl.
CPC .............. *A47C 5/10* (2013.01); *A47C 4/03* (2013.01); *A47C 5/12* (2013.01); *A47C 7/705* (2018.08); *A47D 1/008* (2013.01); *F16B 12/42* (2013.01); *F16B 12/44* (2013.01); *A47B 2013/022* (2013.01)

(58) Field of Classification Search
CPC ........... A47C 4/02; A47C 4/021; A47C 4/022; A47C 4/03; A47C 4/04; A47C 4/08; A47C 4/10; A47C 4/12; A47C 4/16; A47C 4/18; A47C 4/20; A47C 4/22; A47C 4/26; A47C 4/32; A47C 4/34; A47C 4/36; A47C 4/38; A47C 4/42; A47C 4/44; A47C 4/48; A47C 4/283; A47C 7/002; A47C 7/705; A47C 5/10; A47C 5/12; A47D 1/008; A47D 1/0081; A47D 1/0085; A47B 2013/022; F16B 12/42; F16B 12/44

USPC ... 297/16.1, 16.2, 25, 45, 51, 148, 149, 151, 297/153, 440.1, 440.13–440.15, 297/440.22–440.24, 451.8, 452.2, 451.13, 297/461; 52/834
See application file for complete search history.

(56) References Cited

U.S. PATENT DOCUMENTS

| 398,943 A | * | 3/1889 | Crandall | ................ A47C 4/286 |
| | | | | 297/45 |
| 2,024,330 A | * | 12/1935 | Bemis | .................... A47C 7/002 |
| | | | | 248/158 |

(Continued)

FOREIGN PATENT DOCUMENTS

| CN | 208676675 U | * | 4/2019 | |
| DE | 202015103132 U1 | * | 7/2015 | ............. A47D 1/023 |

(Continued)

OTHER PUBLICATIONS 19 page PDF of machine translation of DE 202015103132U1. (Year: 2015).*

(Continued)

*Primary Examiner* — Robert Canfield
(74) *Attorney, Agent, or Firm* — Burris Law, PLLC

(57) ABSTRACT

A modular chair assembly includes a seat member and at least three support leg units. The seat unit includes a seat member which has a lower surface and an upper surface opposite to the lower surface. Each of the three support leg units is detachably mounted to the lower surface of the seat member, and includes an inner axle and a hollow tube sleeved on the inner axle. The inner axle and the hollow tube are made of different materials to permit the inner axle to have a larger anti-bending strength than the hollow tube. The inner axle includes a bottom end surface for being supported on the ground.

17 Claims, 15 Drawing Sheets

(51) Int. Cl.
*A47C 5/10* (2006.01)
*A47C 4/03* (2006.01)
*A47C 7/70* (2006.01)

(56) References Cited

U.S. PATENT DOCUMENTS

| | | | | |
|---|---|---|---|---|
| 2,697,575 A | * | 12/1954 | Eames | A47C 5/046 |
| | | | | 248/175 |
| 2,975,546 A | * | 3/1961 | Beene, III | A47B 91/066 |
| | | | | 248/188.3 |
| 3,143,375 A | * | 8/1964 | Langbaum | F16B 9/054 |
| | | | | 297/423.46 |
| 3,200,554 A | * | 8/1965 | Goodman | A47B 91/00 |
| | | | | 52/832 |
| 3,443,530 A | * | 5/1969 | Carlson | A47B 13/021 |
| | | | | 108/156 |
| 4,035,978 A | * | 7/1977 | Bajorek | E04F 11/1842 |
| | | | | 52/832 |
| 5,035,401 A | * | 7/1991 | Solter | E04F 11/181 |
| | | | | 256/19 |
| 5,876,021 A | * | 3/1999 | Spence | E04F 11/1842 |
| | | | | 256/19 |
| 10,246,896 B2 | * | 4/2019 | Libby | H01Q 1/48 |
| 2001/0052723 A1 | * | 12/2001 | Wu | A47C 4/022 |
| | | | | 297/440.1 |
| 2009/0140110 A1 | * | 6/2009 | Saffell | F16B 12/44 |
| | | | | 248/188 |
| 2017/0188711 A1 | * | 7/2017 | Howell | A47C 7/624 |

FOREIGN PATENT DOCUMENTS

| | | | | |
|---|---|---|---|---|
| FR | 2344205 A7 | * | 10/1977 | A47C 4/03 |
| GB | 896578 A | * | 5/1962 | A47B 13/021 |

OTHER PUBLICATIONS 6 page PDF of machine translation of CN 208676675-U (Year: 2019).*

3 page PDF of machine translation of FR 2344205. (Year: 1977).*

* cited by examiner

MODULAR CHAIR ASSEMBLY

FIELD

The disclosure relates to a chair, more particularly to a modular chair assembly.

BACKGROUND

As shown in FIG. 1, a conventional chair assembly 1 may includes a chair main body 11 and four leg units 12. Each of the leg units 12 includes a support segment 122 mounted beneath said chair main body 1, and a leg segment 121 which is integrally formed with the support segment 122, and which is supported on the ground.

To ensure the overall structure strength of the conventional chair assembly 1, the chair main body 11 and the leg units 12 are undetachably secured together. Therefore, the conventional chair assembly 1 is bulky and inconvenient to transport and store.

In another conventional chair assembly, support legs are detachably mounted to a chair main body, and are made of metal to ensure the chair assembly to have sufficient structure strength. However, in this case, the overall aesthetic design of the chair assembly is limited.

SUMMARY

Therefore, an object of the disclosure is to provide a novel modular chair assembly which may have both aesthetic appearance and good overall structural strength, and which may be disassembled for easy transportation.

According to the disclosure, a modular chair assembly includes a seat member and at least three support leg units. The seat unit includes a seat member which has a lower surface and an upper surface opposite to the lower surface. Each of the three support leg units is detachably mounted to the lower surface of the seat member, and includes an inner axle and a hollow tube sleeved on the inner axle. The inner axle and the hollow tube are made of different materials to permit the inner axle to have a larger anti-bending strength than the hollow tube. The inner axle includes a bottom end surface for being supported on the ground.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

Figure 1:
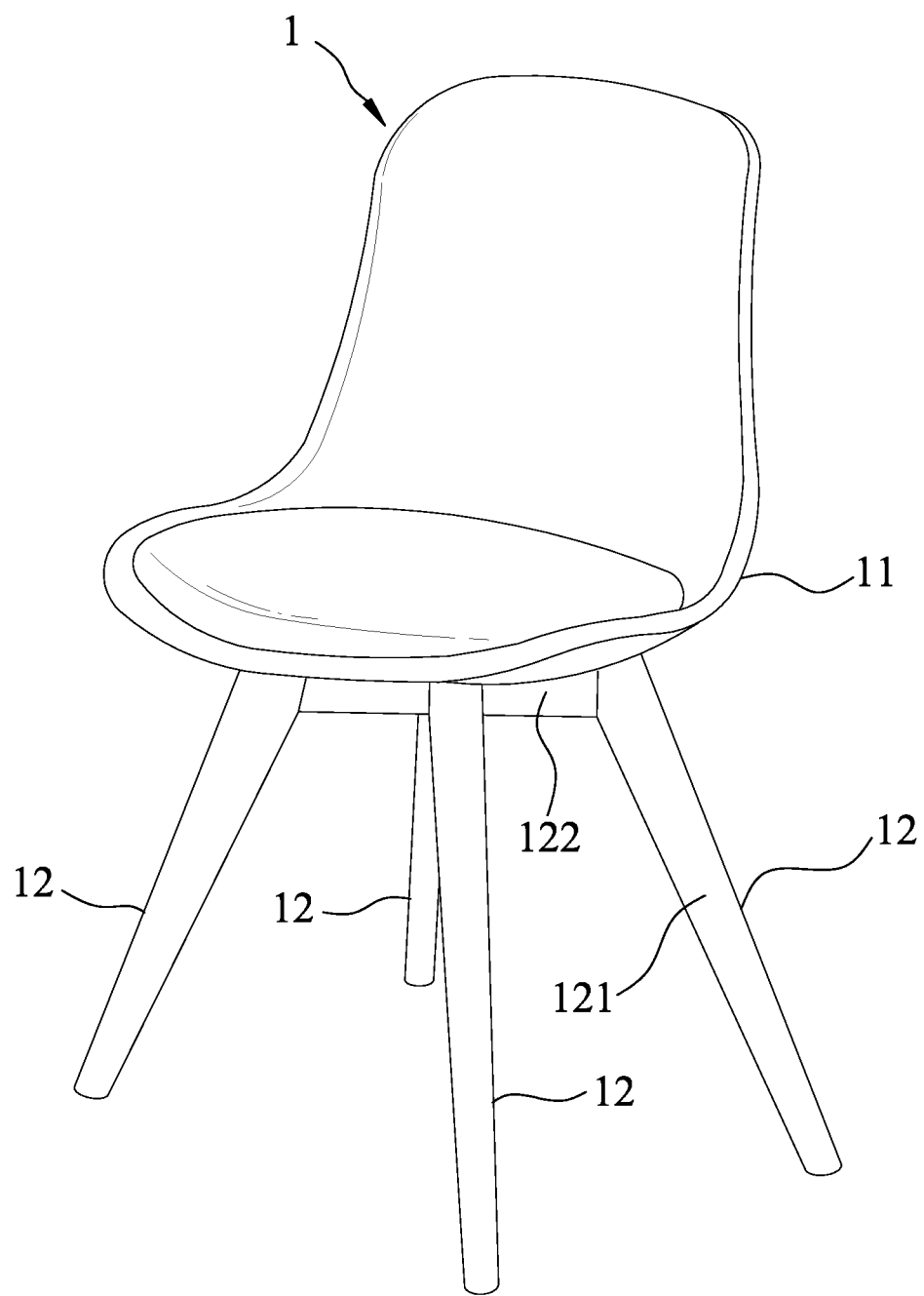
FIG. 1 is a perspective view of a conventional chair assembly.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 2:
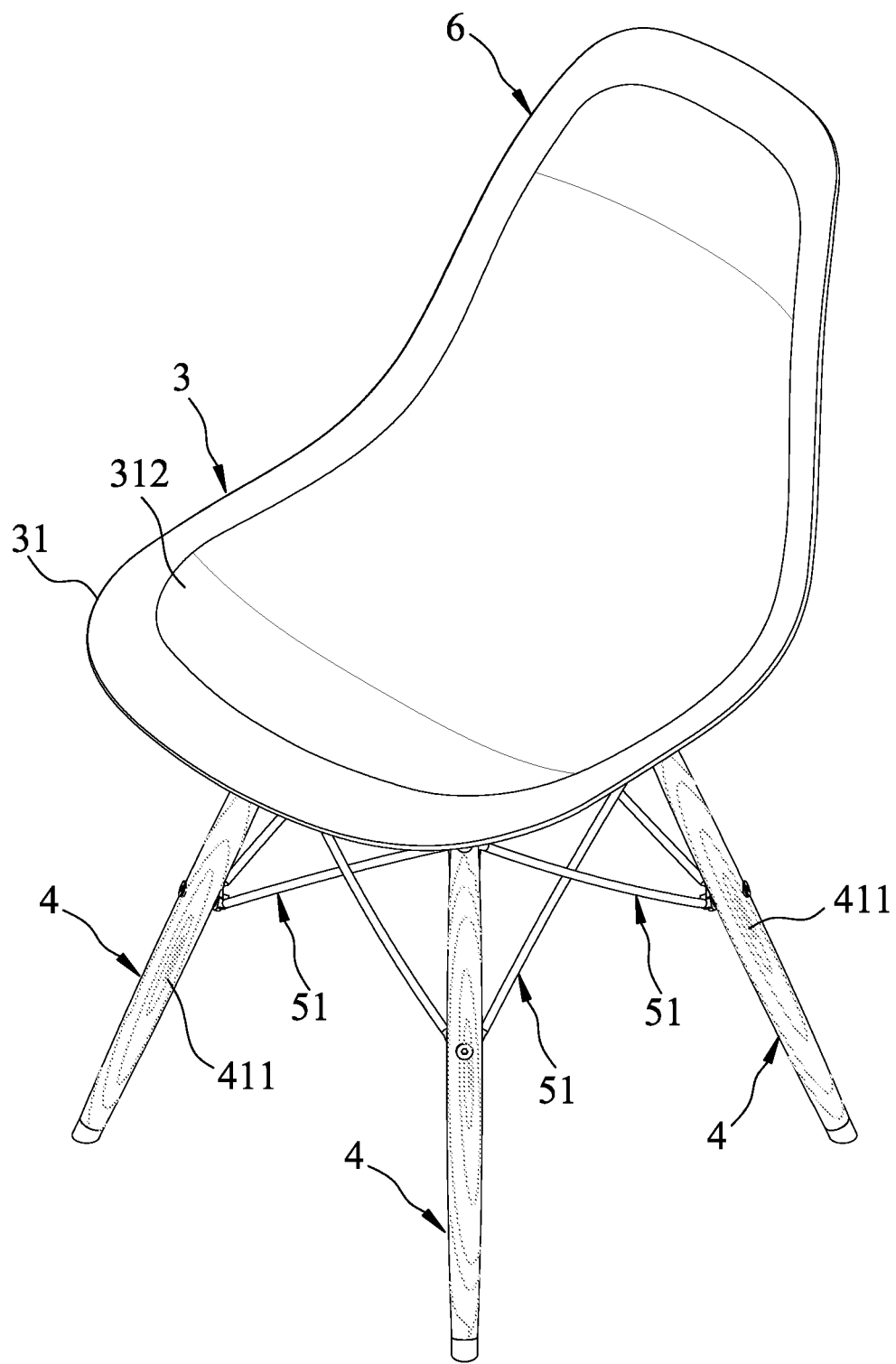
FIG. 2 is a perspective view of a modular chair assembly according to a first embodiment of the disclosure.
Figure 3:
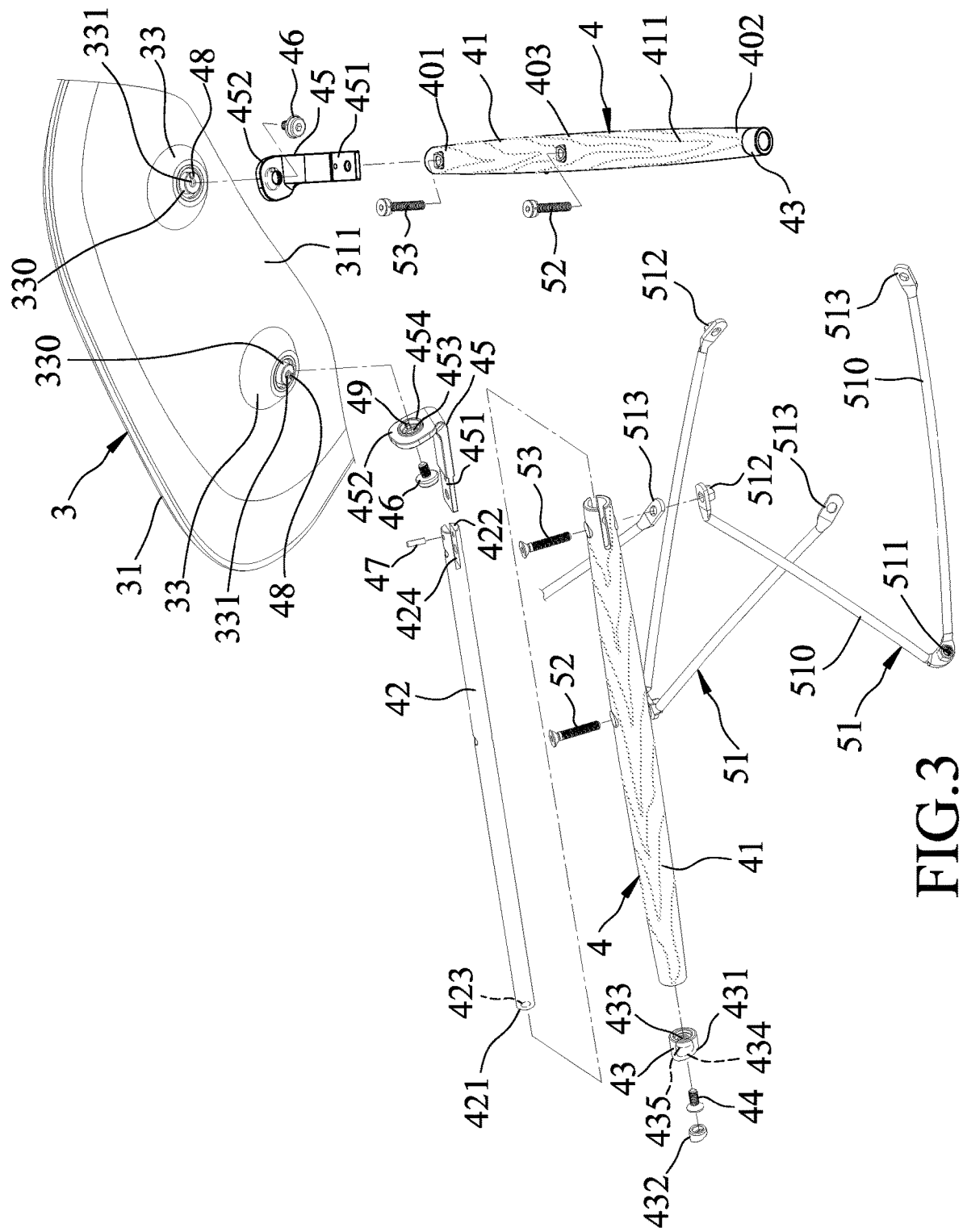
FIG. 3 is a fragmentary exploded perspective view of the first embodiment.

Referring to FIGS. 2 and 3, a modular chair assembly according to a first embodiment of the disclosure is shown to include a seat unit 3 and at least three support leg units 4.

Figure 8:
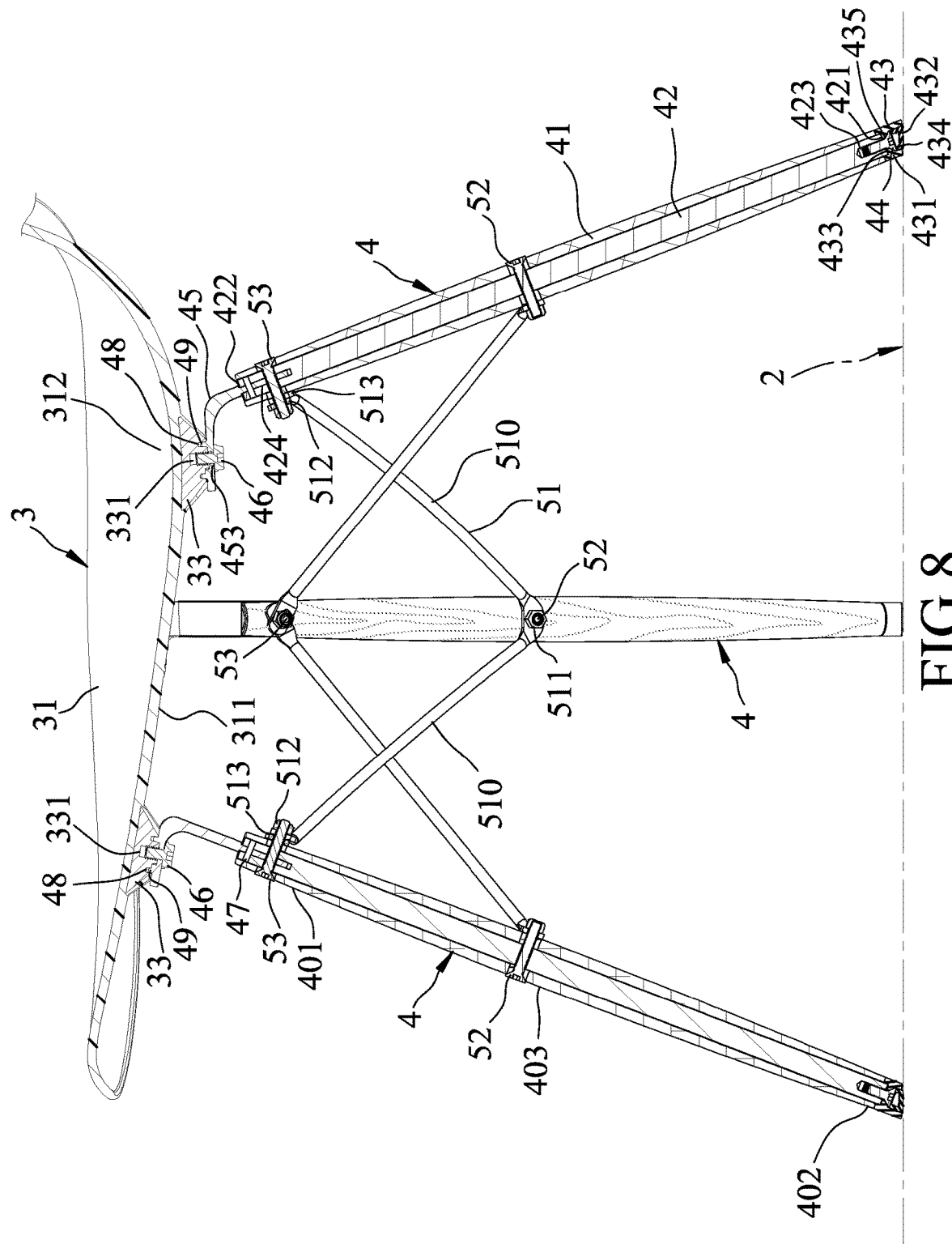
FIG. 8 is a fragmentary cross-sectional view taken along line VIII-VIII of FIG. 7.

The seat unit 3 includes a seat member 31 having a lower surface 311 which is disposed for confronting the ground 2 shown in FIG. 8, and an upper surface 312 which is opposite to the lower surface 311. In an embodiment shown in FIGS. 3 and 8, the seat unit 3 may include at least three mounting seats 33 (only two are shown). The mounting seats 33 are provided on the lower surface 311 of the seat member 31, and each of the mounting seats 33 has an inner threaded hole 331 and an outer coupling portion 330.

Each of the support leg units 4 is detachably mounted to the lower surface 311 of the seat member 31, and includes an inner axle 42 and a hollow tube 41 sleeved on the inner axle 42. The inner axle 42 and the hollow tube 41 are made of different materials to permit the inner axle 42 to have a larger anti-bending strength than the hollow tube 41. Therefore, the modular chair assembly may have both aesthetic appearance and good overall structural strength, and may be disassembled for easy transportation.

In an embodiment, the hollow tube 41 may be made of a plastic material or a wooden material, and the inner axle 42 may be made of metal.

Figure 4:
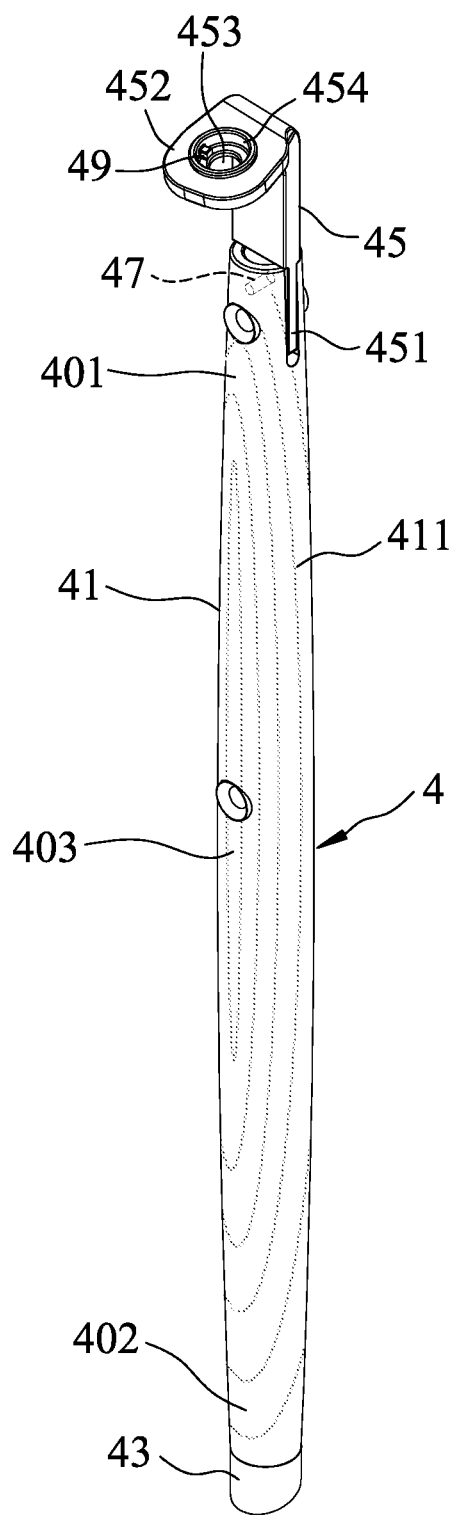
FIG. 4 is a perspective view illustrating some elements of a support leg unit of the first embodiment.

As shown in FIGS. 3, 4, and 8, the hollow tube 41 includes an upper tube segment 401, a lower tube segment 402, and a middle tube segment 403 between the upper and lower tube segments 401, 402. The inner axle 42 includes a bottom end surface 421 for being supported on the ground 2, and a top end surface 422 opposite to the bottom end surface 421.

In an embodiment shown in FIGS. 3 and 8, the bottom end surface 421 of the inner axle 42 may be formed with a bottom threaded hole 423, and the top end surface 422 may be formed with an insert slot 424.

In an embodiment shown in FIG. 4, the hollow tube 41 may have a decorated pattern 411 on an outer peripheral surface thereof. The decorated pattern 411 may be a wood grain pattern, a text pattern (such as greetings), a graphic pattern, a line pattern, or a portrait pattern, and may be formed by laser engraving or spray-painting the outer peripheral surface of the hollow tube 41. Alternatively, a film with the decorated pattern 411 may be adhered on the outer peripheral surface of the hollow tube 41 using an adhesive.

In an embodiment shown in FIGS. 3 and 8, each of the support leg units 4 may further include a foot pad 43 detachably mounted to the bottom end surface 421 of the inner axle 42.

In an embodiment shown in FIGS. 3 and 8, each of the support leg units 4 may further include a bottom screw member 44 which extends into the foot pad 43 to be brought into threaded engagement with the bottom threaded hole 423, so as to mount the foot pad 43 to the bottom end surface 421 of the inner axle 42.

In addition, the foot pad 43 may have a pad body 431 and an end cap 432. The pad body 431 has a through hole having an upper hole region 433 for receiving a bottom end of the inner axle 42, a lower hole region 434, and a middle retaining hole region 435 between the upper and lower hole regions 431, 434. When the bottom screw member 44 extends into the foot pad 43, an enlarged head of the bottom screw member 44 is retained by the middle retaining hole region 435, and a threaded portion of the bottom screw member 44 is in threaded engagement with the bottom threaded hole 423. After the foot pad 43 is mounted to the bottom end surface 421 of the inner axle 42, the end cap 42 is fitted into the lower hole region 434 to prevent the bottom screw member 44 from coming into contact with the ground 2.

In an embodiment shown in FIGS. 3, 4, and 8, each of the support leg units 4 may further include a coupling piece 45 and a coupling pin 47.

The coupling piece 45 has a first segment 451 and a second segment 452. The first segment 451 is configured to be fitted into the insert slot 424, and the second segment 452 defines an included angle with the first segment 451 and is configured to be detachably secured to the lower surface 311 of the seat member 31.

In an embodiment shown in FIGS. 3 and 8, each of the support leg units 4 may further include a threaded bolt 46 and the second segment 452 of the coupling piece 45 may include a through bore 453 which extends along a bore axis, and an upward coupling region 454 which extends about the bore axis. When the second segment 452 of the coupling piece 45 of each of the support leg units 4 is disposed on a respective one of the mounting seats 33 to align the through bore 453 with the inner threaded hole 331 of the respective mounting seat 33, the upward coupling region 454 is permitted to be brought into mating engagement with the outer coupling portion 330 of the respective mounting seat 33. The threaded bolt 46 is configured to extend through the through bore 453 of the coupling piece 45 to be brought into threaded engagement with the inner threaded hole 331 of the respective mounting seat 33, thereby permitting each of the support leg units 4 to be detachably mounted to the lower surface 311 of the seat member 31.

In an embodiment shown in FIGS. 3, 4, and 8, each of the support leg units 4 may further include a concave element 48 and a convex element 49. The concave element 48 is formed in one of the upward coupling region 454 and the outer coupling portion 330 of the respective mounting seat 33. The convex element 49 is formed on the other one of the upward coupling region 454 and the outer coupling portion 330 of the respective mounting seat 33, and is positioned in the concave element 48 when the upward coupling region 454 is brought into mating engagement with the outer coupling portion 330 of the respective mounting seat 33, so as to permit the inner axle 42 to be angularly positioned relative to the lower surface 311 of the seat member 31.

The coupling pin 47 extends through the inner axle 42 and the first segment 451 of the coupling piece 45 so as to permit the coupling piece 45 to be coupled with the inner axle 42.

Furthermore, the length of each of the hollow tube 41, the inner axle 42, the foot pad 43 and the first segment 451 of the coupling piece 45 may be varied based on design requirements.

Figure 5:
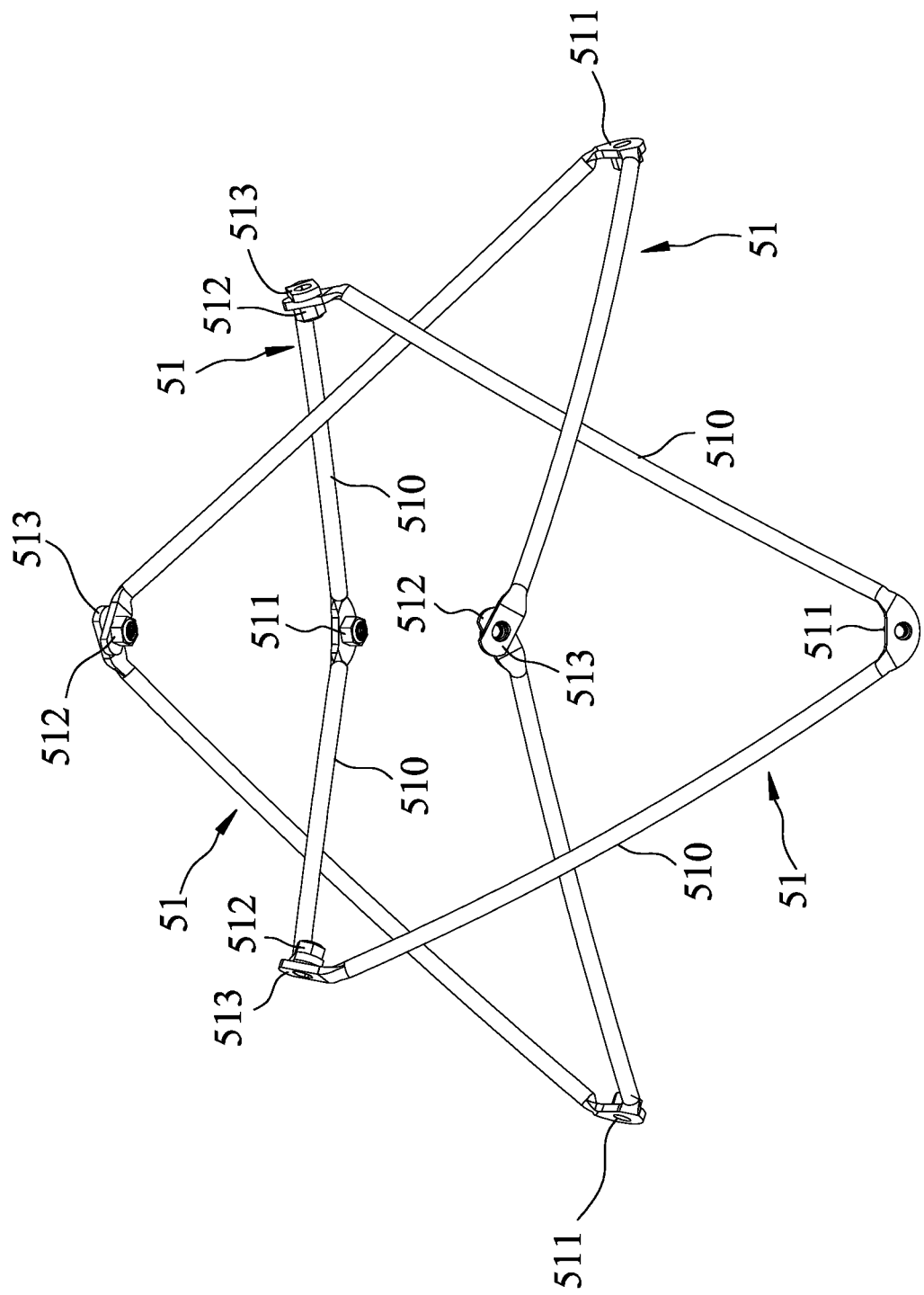
FIG. 5 is a perspective view illustrating a plurality of V-shaped struts of the first embodiment.
Figure 6:
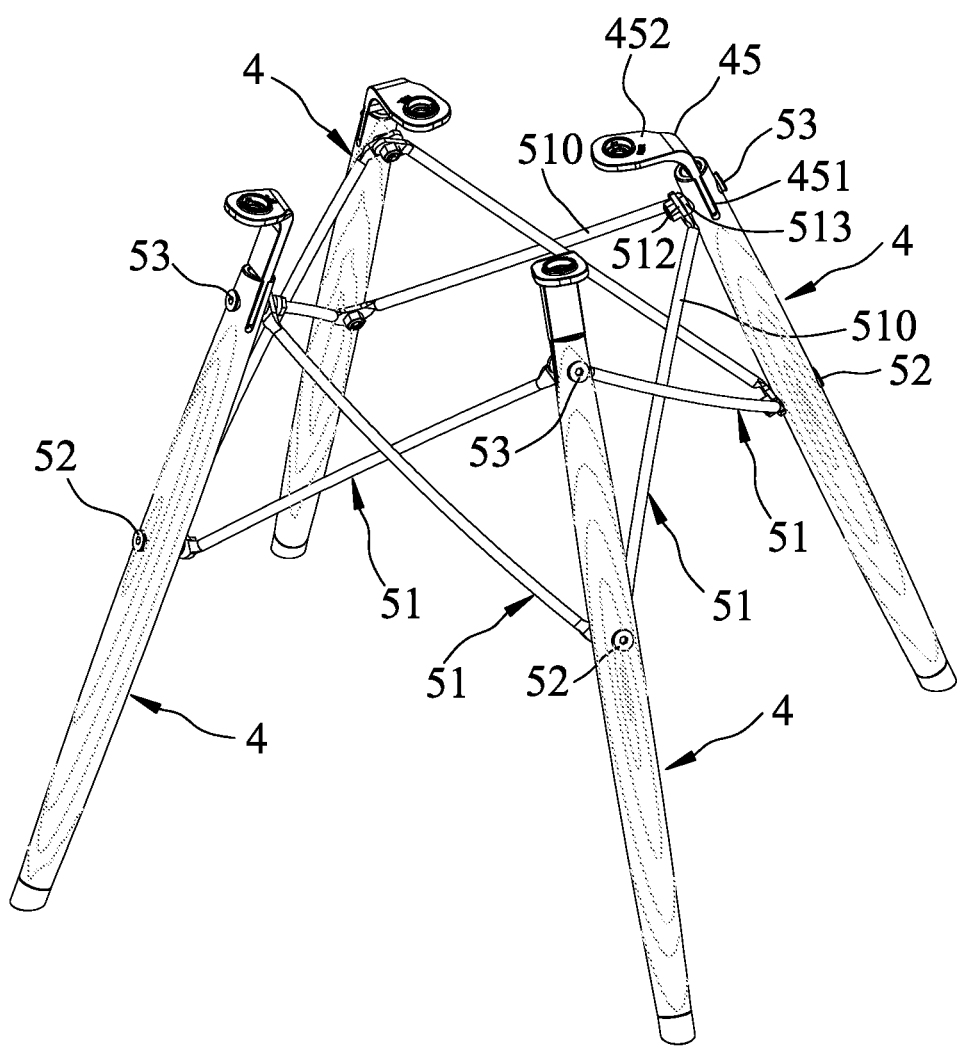
FIG. 6 is a perspective view illustrating the support leg units and the V-shaped struts of the first embodiment in an assembled state.
Figure 7:
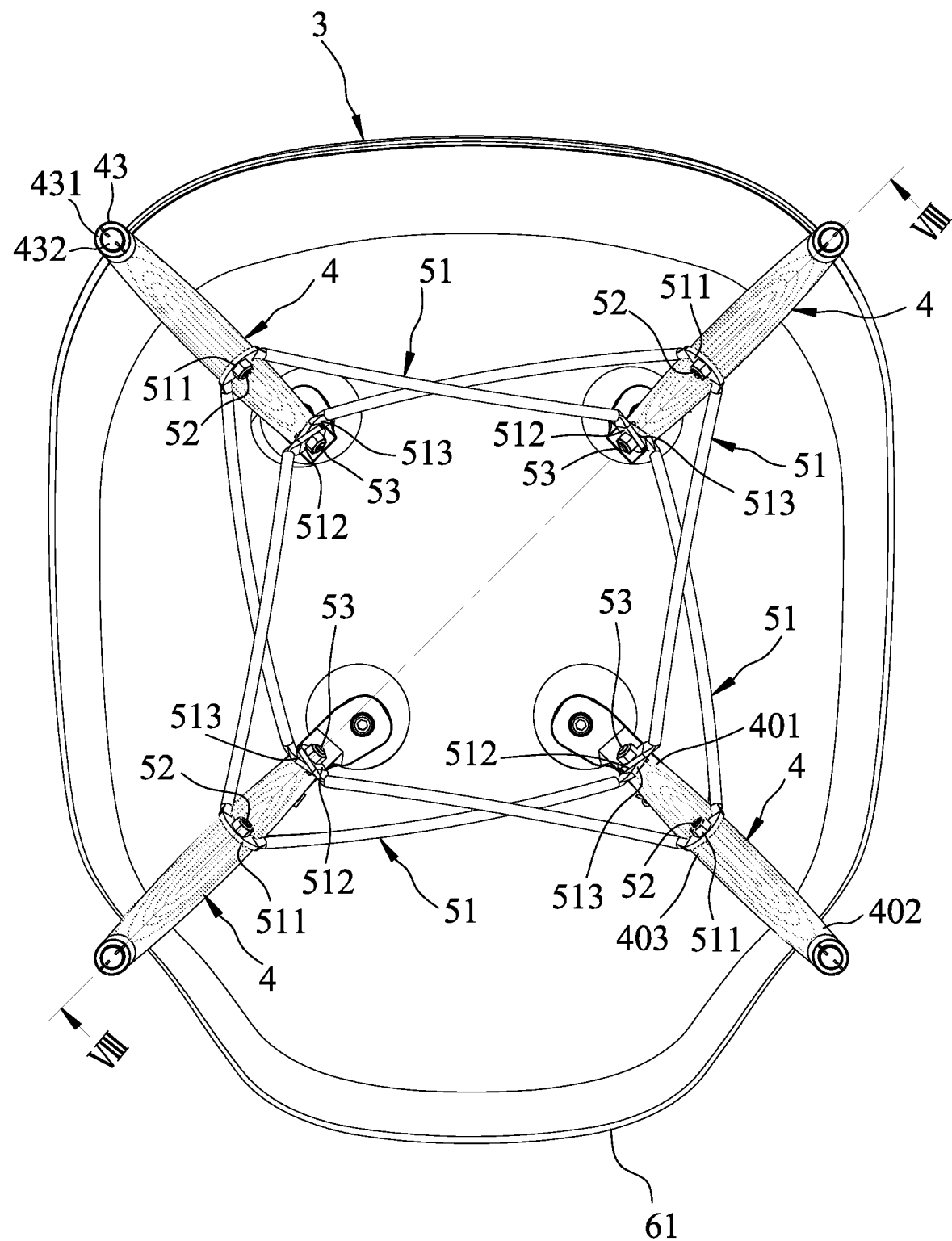
FIG. 7 is a bottom view of the first embodiment.

In an embodiment shown in FIGS. 5 to 7, the modular chair assembly may further include at least three V-shaped struts 51 each of which includes a valley 511, a first end 512, and a second end 513. The valley 511 is detachably mounted to the middle tube segment 403 of the hollow tube 41 of a respective one of the support leg units 4. The first and second ends 512, 513 are detachably and respectively mounted to the upper tube segments 401 of the hollow tubes 41 of two of the support leg units 4 at two opposite sides of the respective support leg unit 4.

In an embodiment shown in FIGS. 6 and 7, each of the V-shaped struts 51 has two elongated rods 510 each having a connected end and a free end. A first metal piece with a first threaded hole is welded between the connected ends of the elongated rods 510 to form the valley 511 with the first threaded hole, a second metal piece with a second threaded hole is welded to one of the free ends of the elongated rods 510 to form the first end 512 with the second threaded hole, and a third metal piece with a through hole is welded to the other one of the free ends of the elongated rods 510 to form the second end 513 with the through hole.

In an embodiment shown in FIGS. 6 to 8, each of the support leg units 4 may further include a first fastener 52 and a second fastener 53.

The first fastener 52 is configured to permit the valley 511 of a respective one of the V-shaped struts 51 to be detachably fastened to the middle tube segment 403 of the hollow tube 41. The first fastener 52 may have an outer threaded surface configured to be in threaded engagement with the first threaded hole of the valley 511 of the respective V-shaped strut 51 when the first fastener 52 extends through the middle tube segment 403 of the hollow tube 41.

The second fastener 53 extends though the upper tube segment 401 of the hollow tube 41, the inner axle 42, the first segment 451 of the coupling piece 45, and is configured to permit two corresponding ones of the first and second ends 512, 513 of two of the V-shaped struts 51 at two opposite sides of the respective V-shaped strut 51 to be detachably fastened to the upper tube segment 401 of the hollow tube 41. As shown in FIG. 8, the second fastener 53 extends through the through hole of the corresponding second end 513 and has an outer threaded surface configured to be in threaded engagement with the second threaded hole of the corresponding first end 512.

In an embodiment shown in FIGS. 2 and 5 to 7, the modular chair assembly includes four of the support leg units 4 and four of the V-shaped struts 51, and the seat unit 3 includes four of the mounting seats 33.

In an embodiment shown in FIG. 2, the modular chair assembly may further include a backrest member 6 which is integrally formed with the seat unit 3.

FIGS. 9 to 15 illustrate a modular chair assembly according to a second embodiment of the disclosure. The second embodiment is similar to the first embodiment except for the configuration of the seat unit 3. In the second embodiment, the seat member 31 has two end portions 313 which are opposite to each other in a left-right direction, and the seat unit 3 further includes two lateral walls 321 and two carrier walls 322.

Each of the lateral walls 321 extends upwardly from a respective one of the end portions 313 of the seat member 31 to terminate at an upper end 320. The carrier walls 322 extend oppositely and respectively from the upper ends 320 of the lateral walls 321 in the left-right direction. Each of the carrier walls 322 has an upward surface 323 and a downward surface 324.

Figure 9:
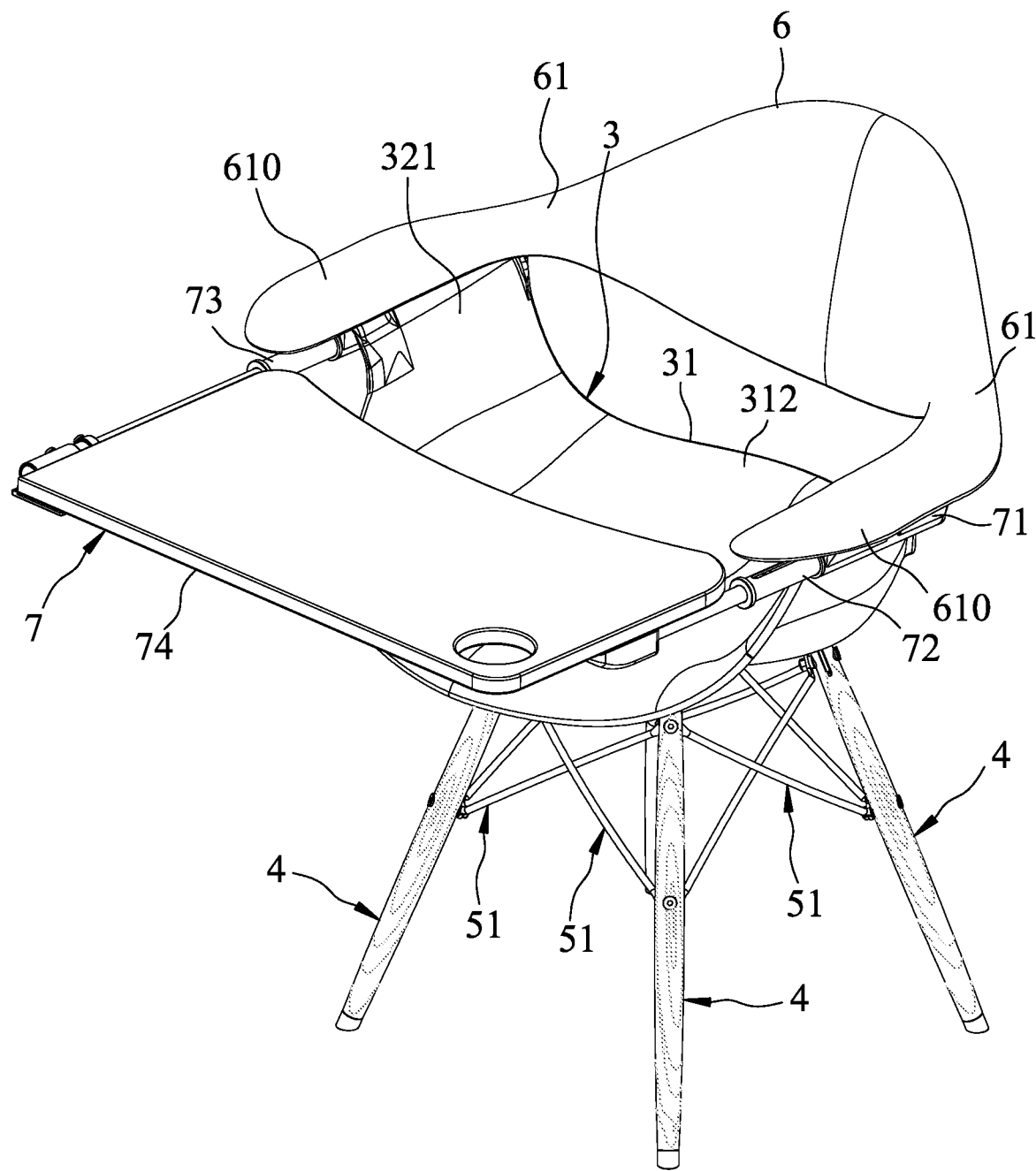
FIG. 9 is a perspective view of a modular chair assembly according to a second embodiment of the disclosure.
Figure 10:
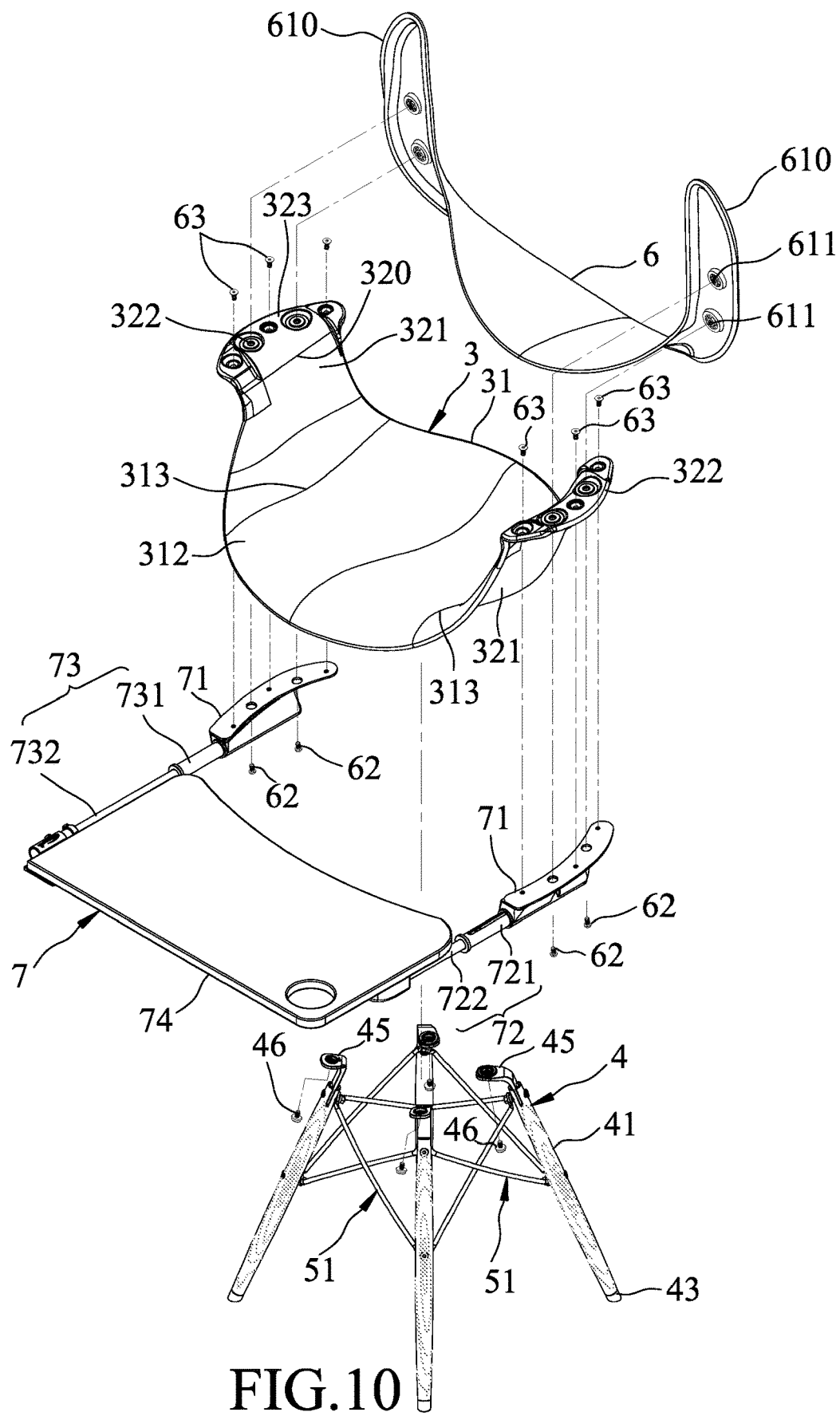
FIG. 10 is a partially exploded perspective view of the second embodiment.
Figure 11:
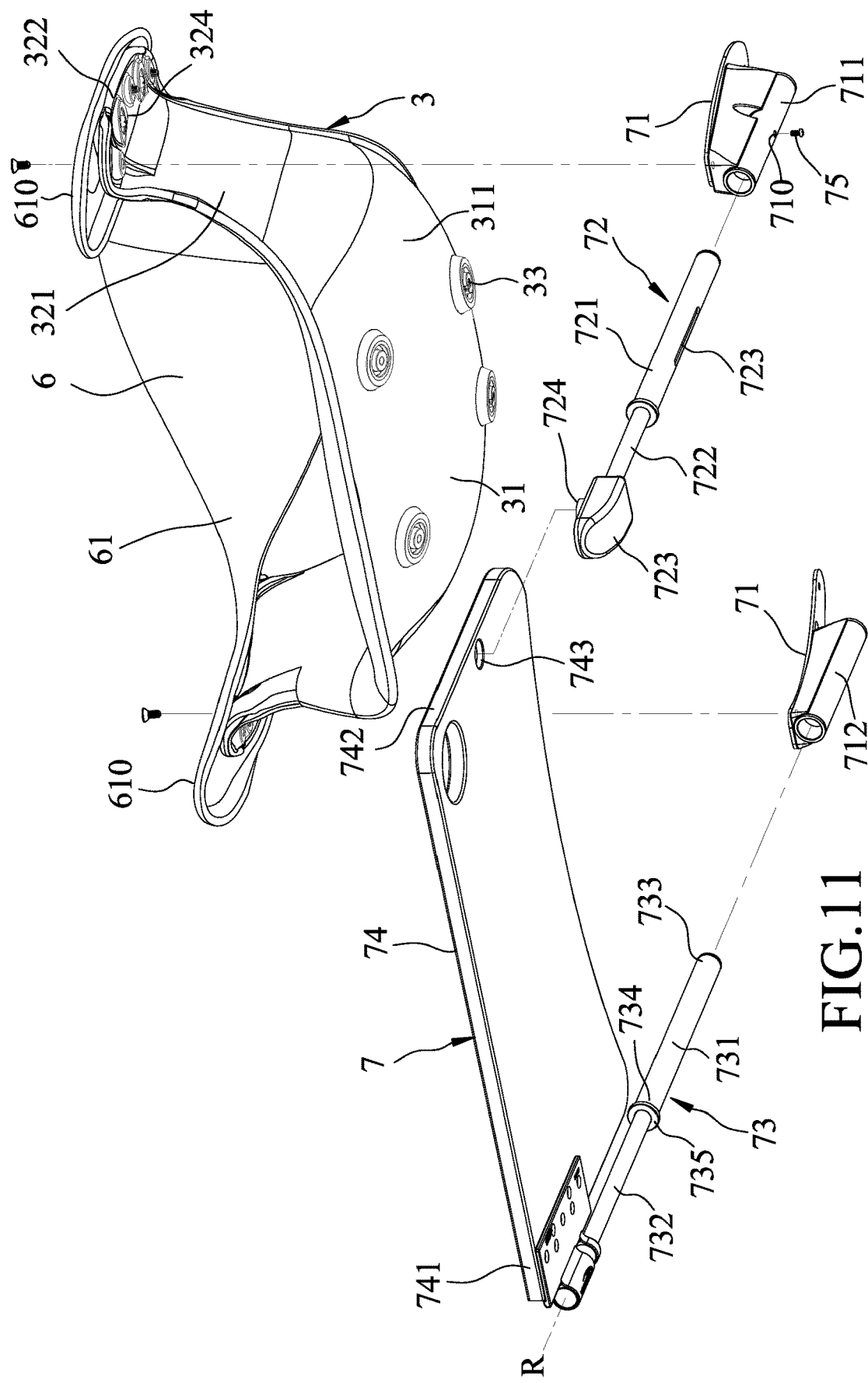
FIG. 11 is a fragmentary, partially exploded perspective view of the second embodiment.

In an embodiment shown in FIGS. 9 and 11, the backrest member 6 has two lateral regions 61 opposite to each other in the left-right direction, and the modular chair assembly may further include two armrest members 610 which extend forwardly and respectively from the lateral regions 61, and which are detachably and respectively mounted on the upward surfaces 323 of the carrier walls 322 so as to permit the backrest member 6 and the armrest members 610 to be detachably mounted to the seat unit 3. Each of screws 62 shown in FIG. 10 may extend upwardly through one of the carrier walls 322 to be brought into threaded engagement with a threaded bore 611 of a respective one of the armrest members 610.

Figure 15:
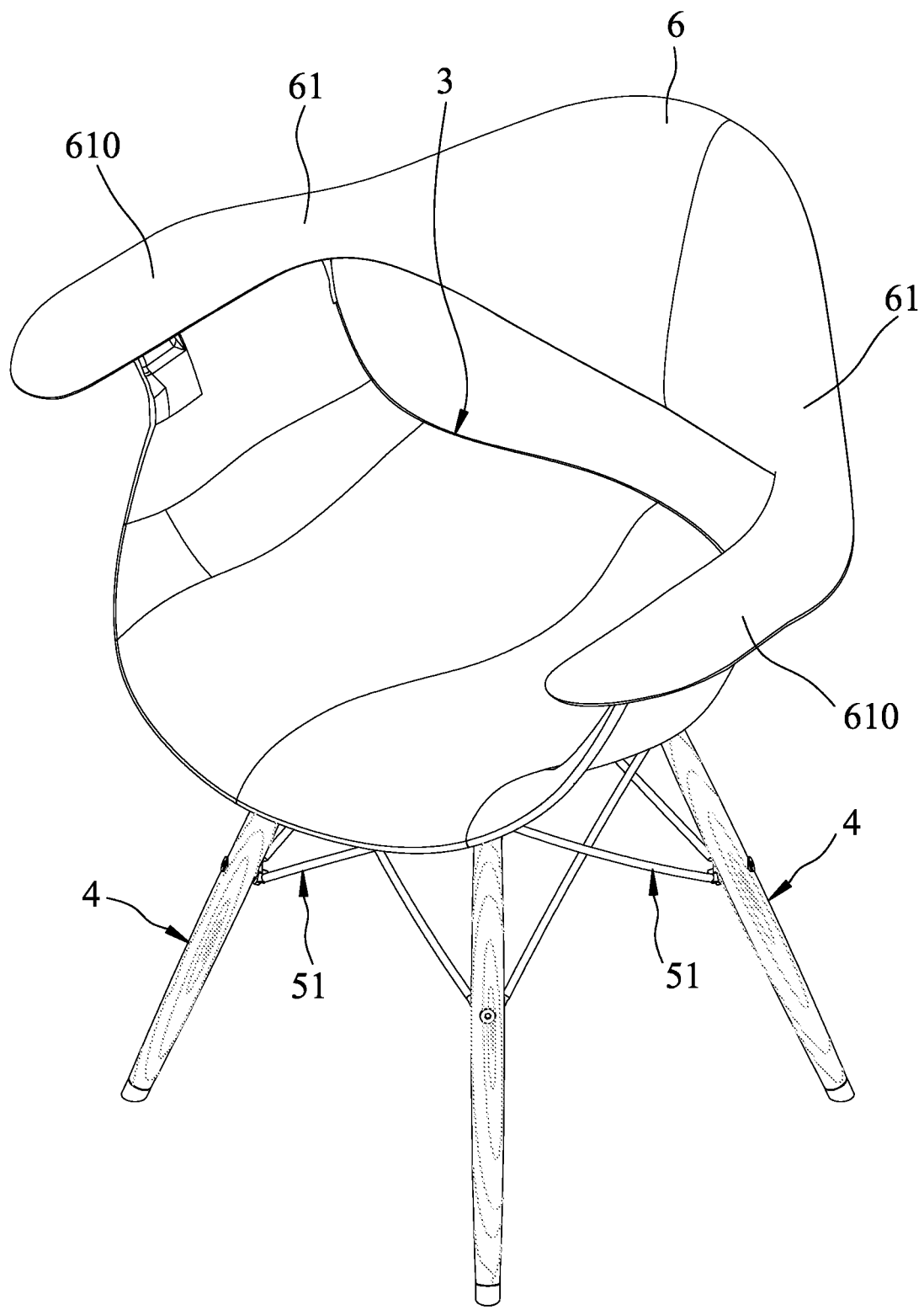
FIG. 15 is similar to FIG. 9 but omitting a tray subassembly.

In an embodiment shown in FIGS. 9 to 11, the modular chair assembly may further include a tray subassembly 7 which is detachably mounted to the downward surfaces 324 of the carrier walls 322. FIG. 15 illustrates the tray subassembly 7 detached from the seat unit 3.

In an embodiment shown in FIGS. 10 to 14, the tray subassembly 7 may include two retainers 71, a first tube 711, a second tube 712, a first rod unit 72, a second rod unit 73, and a tray member 74.

The retainers 71 are detachably mounted beneath the downward surfaces 324 of the carrier walls 322, respectively. Each of screws 63 shown in FIG. 10 may extend downwardly through one of the carrier walls 322 to be brought into threaded engagement with a threaded bore of a respective one of the retainers 71.

The first and second tubes 711, 712 are configured to be retained respectively by the retainers 71.

The first rod unit 72 has a first rear hollow rod 721 which is slidably retained in the first tube 711, and a first front rod 722 which is telescopically connected to the first rear hollow rod 721.

Figure 12:
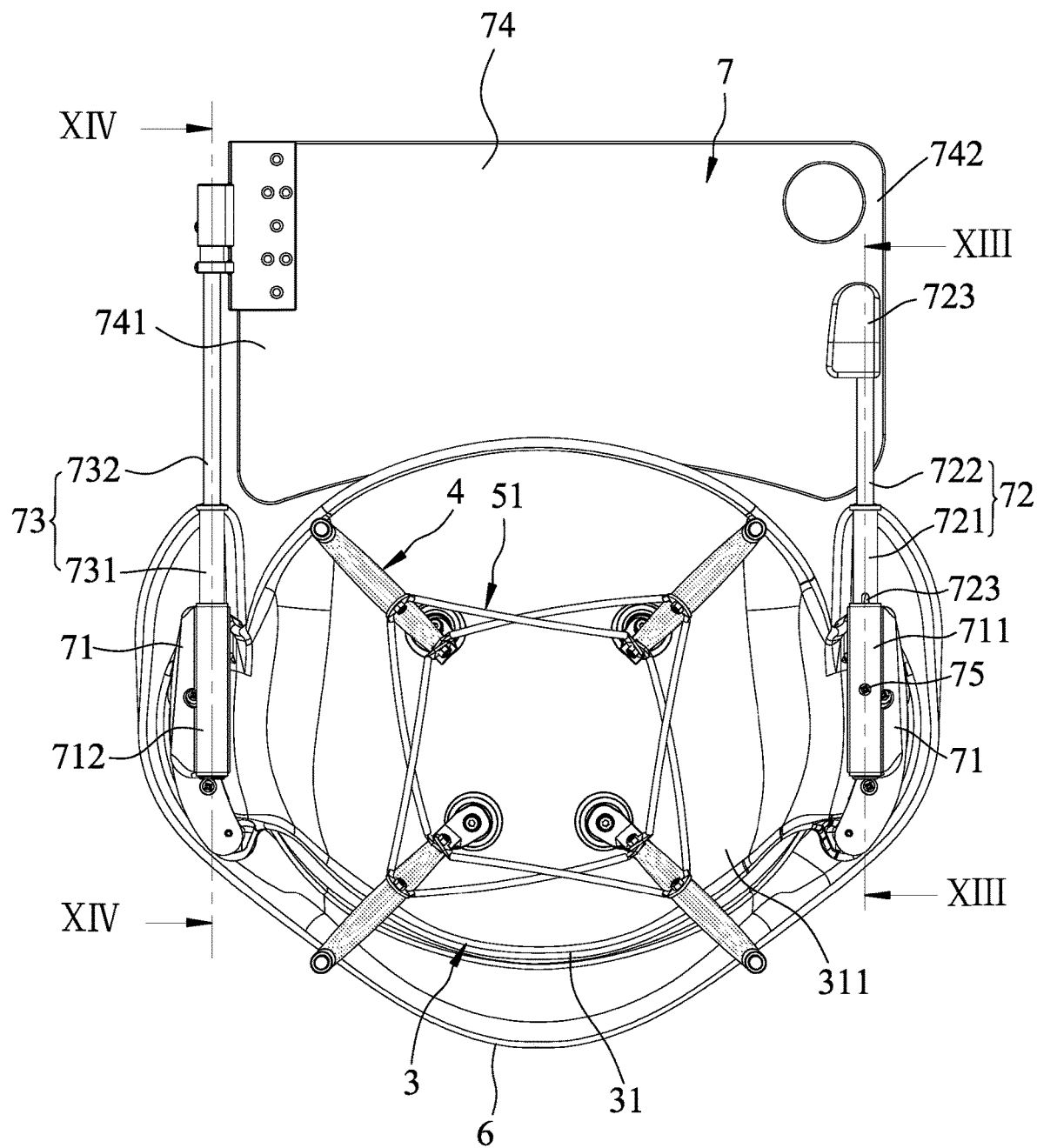
FIG. 12 is a bottom view of the second embodiment.
Figure 13:
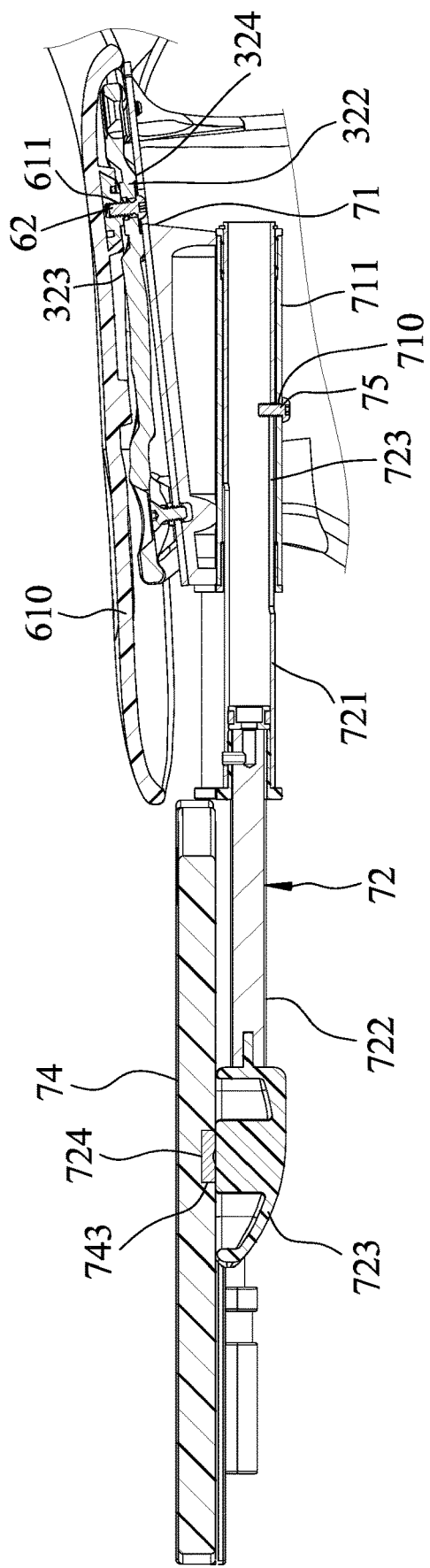
FIG. 13 is a fragmentary cross-sectional view taken along line XIII-XIII of FIG. 12.

In an embodiment shown in FIGS. 11 to 13, the first rear hollow rod 721 may have an elongated groove 723, and the tray subassembly 7 may further include a positioning screw 75 which extends through a threaded aperture 710 of the first tube 711 into the elongated groove 723 so as to permit the first rear hollow rod 721 to be slidably retained in the first tube 711. In addition, the first front rod 722 may have a front enlarged head 723.

The second rod unit 73 has a second rear hollow rod 731 which is slidably retained in the second tube 712, and a second front rod 732 which is telescopically connected to the second rear hollow rod 731, and which extends along a rod axis (R) (see FIG. 11).

Figure 14:
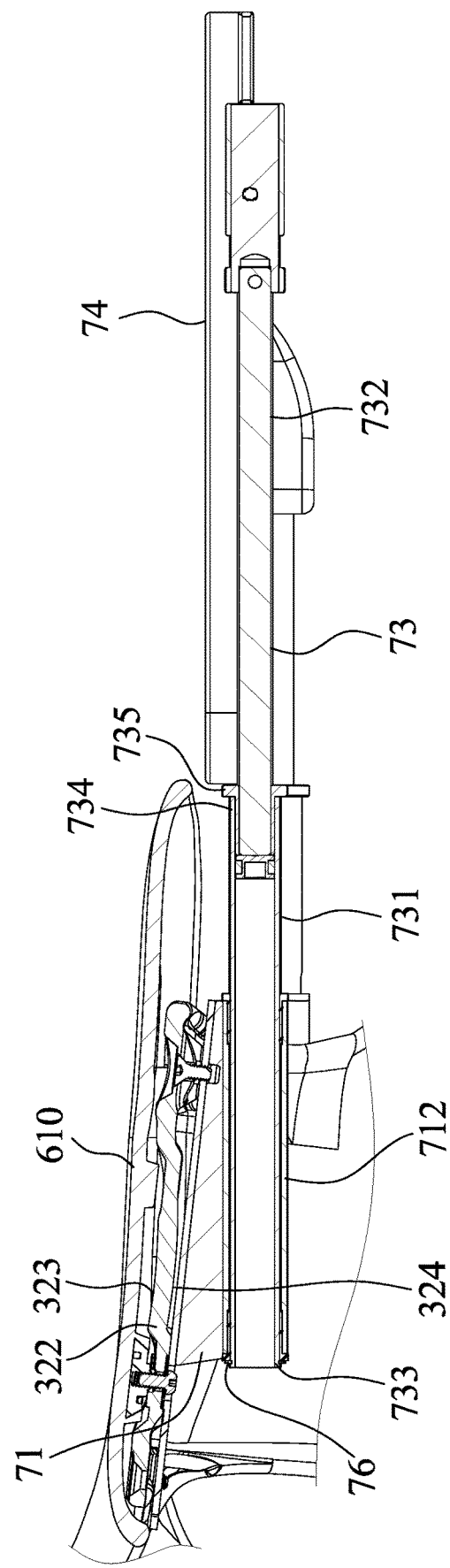
FIG. 14 is a fragmentary cross-sectional view taken along line XIV-XIV of FIG. 12.

In an embodiment shown in FIGS. 11, 12, and 14, the second rear hollow rod 731 extends lengthwise to terminate at a rear rod end 733 and a front rod end 734 which is telescopically connected to the second front rod 732 and which has an outer flange 735 thereon. The outer flange 735 has an outer dimension larger than an inner dimension of the second tube 712 so as to limit rearward sliding of the second rear hollow rod 731. In addition, a C-shaped gripper 76 (shown in FIG. 14) is detachably mounted on the rear rod end 733 of the second rear hollow rod 731, and has an outer dimension larger than the inner dimension of the second tube 712 so as to limit forward sliding of the second rear hollow rod 731, thereby permitting the second rear hollow rod 731 to be retained slidably in the second tube 712.

The tray member 74 has a first marginal portion 741 and a second marginal portion 742. The first marginal portion 741 is connected to the second front rod 732 to permit the tray member 74 to turn relative to the second front rod 732 about the rod axis (R). The second marginal portion 742 is opposite to the first marginal portion 741, and is configured to be detachably supported by the first front rod 722.

In an embodiment shown in FIGS. 11 and 13, the tray subassembly 7 may further include a protuberance 724 and a recess 743. The protuberance 724 is provided on the front enlarged head 723 of the first front rod 722. The recess 743 is formed in the second marginal portion 742 of the tray member 74 to receive the protuberance 724 so as to permit the second marginal portion 742 of the tray member 74 to be detachably supported by the first front rod 722.

In sum, the modular chair assembly may have both aesthetic appearance and good overall structural strength, and may be disassembled for easy transportation In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A modular chair assembly comprising:
   a seat unit including a seat member which has a lower surface and an upper surface opposite to said lower surface; and
   at least three support leg units each of which is detachably mounted to said lower surface of said seat member, and each of which includes an inner axle and a hollow tube sleeved on said inner axle, said inner axle and said hollow tube being made of different materials to permit said inner axle to have a larger anti-bending strength than said hollow tube, said inner axle including a bottom end surface for being supported on the ground, wherein said inner axle includes a top end surface which is opposite to said bottom end surface and which is formed with an insert slot, each of said support leg units including
   a coupling piece having a first segment which is configured to be fitted into said insert slot, and a second segment which defines an included angle with said first segment and which is configured to be detachably secured to said lower surface of said seat member, and a coupling pin extending through said inner axle and said first segment of said coupling piece so as to permit said coupling piece to be coupled with said inner axle.

2. The modular chair assembly according to claim 1, wherein each of said support leg units further includes a foot pad detachably mounted to said bottom end surface of said inner axle.

3. The modular chair assembly according to claim 2, wherein said bottom end surface of said inner axle is formed with a bottom threaded hole, each of said support leg units including a bottom screw member which extends into said foot pad to be in threaded engagement with said bottom threaded hole so as to mount said foot pad to said bottom end surface of said inner axle.

4. The modular chair assembly according to claim 1,
wherein said seat unit further includes at least three mounting seats which are provided on said lower surface of said seat member, each of said mounting seats having an inner threaded hole and an outer coupling portion;

wherein said second segment of said coupling piece includes a through bore which extends along a bore axis, and an upward coupling region which extends about the bore axis such that when said second segment of said coupling piece of each of said support leg units is disposed on a respective one of said mounting seats to align said through bore with said inner threaded hole of said respective mounting seat, said upward coupling region is permitted to be brought into mating engagement with said outer coupling portion of said respective mounting seat; and wherein each of said support leg units further includes a threaded bolt configured to extend through said through bore of said coupling piece to be brought into threaded engagement with said inner threaded hole of said respective mounting seat, thereby permitting each of said support leg units to be detachably mounted to said lower surface of said seat member.

5. The modular chair assembly according to claim 4, wherein said each of said support leg units further includes a concave element which is formed in one of said upward coupling region and said outer coupling portion of said respective mounting seat, and a convex element which is formed on the other one of said upward coupling region and said outer coupling portion of said respective mounting seat, and which is positioned in said concave element when said upward coupling region is brought into mating engagement with said outer coupling portion of said respective mounting seat, so as to permit said inner axle to be angularly positioned relative to said lower surface of said seat member.

6. The modular chair assembly according to claim 4, wherein said hollow tube includes an upper tube segment, a lower tube segment, and a middle tube segment between said upper and lower tube segments, said modular chair assembly further comprising at least three V-shaped struts each of which includes a valley which is detachably mounted to said middle tube segment of said hollow tube of a respective one of said support leg units, and a first end and a second end which are detachably and respectively mounted to said upper tube segments of said hollow tubes of two of said support leg units at two opposite sides of said respective support leg unit.

7. The modular chair assembly according to claim 6, wherein each of said support leg units further includes a first fastener configured to permit said valley of a respective one of said V-shaped struts to be detachably fastened to said middle tube segment of said hollow tube, and a second fastener which extends though said upper tube segment of said hollow tube, said inner axle, and said first segment of said coupling piece, and which is configured to permit two corresponding ones of said first and second ends of two of said V-shaped struts at two opposite sides of said respective V-shaped strut to be detachably fastened to said upper tube segment of said hollow tube.

8. The modular chair assembly according to claim 6, which comprises four of said support leg units and four of said V-shaped struts, said seat unit including four of said mounting seats.

9. The modular chair assembly according to claim 1, wherein said seat member has two end portions which are opposite to each other in a left-right direction, and said seat unit further includes two lateral walls each of which extends upwardly from a respective one of said end portions of said seat member to terminate at an upper end, and two carrier walls extending oppositely and respectively from said upper ends of said lateral walls in the left-right direction, each of said carrier walls having an upward surface and a downward surface.

10. The modular chair assembly according to claim 9, further comprising a backrest member having two lateral regions opposite to each other in the left-right direction, and two armrest members which extend forwardly and respectively from said lateral regions, and which are detachably and respectively mounted on said upward surfaces of said carrier walls, so as to permit said backrest member and said armrest members to be detachably mounted to said seat unit.

11. The modular chair assembly according to claim 10, further comprising a tray subassembly which is detachably mounted to said downward surfaces of said carrier walls.

12. The modular chair assembly according to claim 11, wherein said tray subassembly includes two retainers which are detachably mounted beneath said downward surfaces of said carrier walls, respectively, a first tube and a second tube which are configured to be retained respectively by said retainers, a first rod unit having a first rear hollow rod which is slidably retained in said first tube, and a first front rod which is telescopically connected to said first rear hollow rod, a second rod unit having a second rear hollow rod which is slidably retained in said second tube, and a second front rod which is telescopically connected to said second rear hollow rod, and which extends along a rod axis, and a tray member having
a first marginal portion which is connected to said second front rod to permit said tray member to turn relative to said second front rod about the rod axis, and a second marginal portion which is opposite to said first marginal portion, and which is configured to be detachably supported by said first front rod.

13. The modular chair assembly according to claim 12, wherein said first rear hollow rod has an elongated groove, and said tray subassembly further includes a positioning screw which extends through a threaded aperture of said first tube into said elongated groove so as to permit said first rear hollow rod to be slidably retained in said first tube.

14. The modular chair assembly according to claim 12, wherein said first front rod has a front enlarged head and said tray subassembly further includes
- a protuberance provided on said front enlarged head of said first front rod, and
- a recess formed in said second marginal portion of said tray member to receive said protuberance so as to permit said second marginal portion of said tray member to be detachably supported by said first front rod.

15. The modular chair assembly according to claim 12, wherein said second rear hollow rod extends lengthwise to terminate at a rear rod end and a front rod end which is telescopically connected to said second front rod and which has thereon an outer flange, said outer flange having an outer dimension larger than an inner dimension of said second tube so as to limit rearward sliding of said second rear hollow rod; and wherein said tray subassembly further includes a C-shaped gripper which is detachably mounted on said rear rod end of said second rear hollow rod, and which has an outer dimension larger than the inner dimension of said second tube so as to limit forward sliding of said second rear hollow rod, thereby permitting said second rear hollow rod to be retained slidably in said second tube.

16. The modular chair assembly according to claim 1, wherein said hollow tube has a decorated pattern on an outer peripheral surface thereof, the decorated pattern being selected from the group consisting of a wood grain pattern, a text pattern, a graphic pattern, a line pattern, and a portrait pattern.

17. The modular chair assembly according to claim 1, wherein said hollow tube is made of a material selected from the group consisting of a plastic material and a wooden material, and said inner axle is made of metal.

* * * * *